DOCUMENT IMPRINTING APPARATUS

Filed Dec. 24, 1963 8 Sheets-Sheet 1

INVENTORS
VERNON WATKINS SPARROW
ARTHUR SIDNEY LEECH
BY Pennie, Edmonds, Morton, Taylor and Adams
ATTORNEYS June 7, 1966 V. W. SPARROW ETAL 3,254,595

DOCUMENT IMPRINTING APPARATUS

Filed Dec. 24, 1963 8 Sheets-Sheet 2

INVENTORS
VERNON WATKINS SPARROW
ARTHUR SIDNEY LEECH

BY Pennie, Edmonds, Morton, Taylor and Adams
ATTORNEYS

DOCUMENT IMPRINTING APPARATUS

Filed Dec. 24, 1963 8 Sheets-Sheet 3

INVENTORS
VERNON WATKINS SPARROW
ARTHUR SIDNEY LEECH
BY
Pennie, Edmonds, Morton,
Taylor and Adams
ATTORNEYS INVENTORS
VERNON WATKINS SPARROW
ARTHUR SIDNEY LEECH
BY
Pennie, Edmonds, Morton, Taylor and Adams
ATTORNEYS INVENTORS
VERNON WATKINS SPARROW
ARTHUR SIDNEY LEECH
BY
Pennie, Edmonds, Morton, Taylor and Adams
ATTORNEYS INVENTORS
VERNON WATKINS SPARROW
ARTHUR SIDNEY LEECH
BY
Pennie, Edmonds, Morton,
Taylor and Adams
ATTORNEYS June 7, 1966 V. W. SPARROW ETAL 3,254,595

DOCUMENT IMPRINTING APPARATUS

Filed Dec. 24, 1963 8 Sheets-Sheet 7

INVENTORS
VERNON WATKINS SPARROW
ARTHUR SIDNEY LEECH
BY
Pennie, Edmonds, Morton,
Taylor and Adams
ATTORNEYS June 7, 1966 V. W. SPARROW ETAL 3,254,595

DOCUMENT IMPRINTING APPARATUS

Filed Dec. 24, 1963 8 Sheets-Sheet 8

INVENTORS
VERNON WATKINS SPARROW
ARTHUR SIDNEY LEECH
BY
Pennie, Edmonds, Morton, Taylor and Adams
ATTORNEYS United States Patent Office 3,254,595

Patented June 7, 1966

3,254,595

DOCUMENT IMPRINTING APPARATUS

Vernon Watkins Sparrow, Oxford Gardens, Denham, England, and Arthur Sidney Leech, 8 Crowshott Ave., Stanmore, England Filed Dec. 24, 1963, Ser. No. 333,138
Claims priority, application Great Britain, Dec. 28, 1962, 48,803/62
4 Claims. (Cl. 101—93)

This invention has reference to document imprinting apparatus and has particular but not exclusive reference to apparatus for imprinting data on bank cheques and other documents in magnetic ink characters so that the characters so imprinted may be recognised by a magnetic character recognition machine.

It is known to print characters on bank cheques in magnetic ink and in machine readable characters so that the characters may be recognised by a magnetic character recognition machine. Such characters may represent for example, the code number of the branch of a bank issuing that cheque and may also represent the customer's account number at that branch of the bank.

Machines have been proposed in which details of a transaction effected, for example, the amount of money for which a cheque is made out, may also be imprinted on the cheque issued by the branch of the bank so that the transaction may be automatically recorded. These machines have however, usually been complex.

It is a principal object of the present invention to provide a relatively simple apparatus for imprinting data on a cheque or like document and it is another object of the present invention to provide apparatus for imprinting data on a cheque utilizing a known calculating machine for effecting the calculation and to sense the data set up on an output of the calculating machine and to imprint it on a cheque.

According to the present invention document imprinting apparatus comprises a document holder to receive a document inserted therein, means to sense the insertion of the document into the holder, a plurality of print members each capable of printing variable data on the document, a plurality of sensing means each adapted to sense data set up on a calculating machine and to set up on the respective print members the corresponding data set up on the calculating machine in accordance with the data sensed and imprinting means to reproduce on the document the data set up on the print members.

Figure 1:
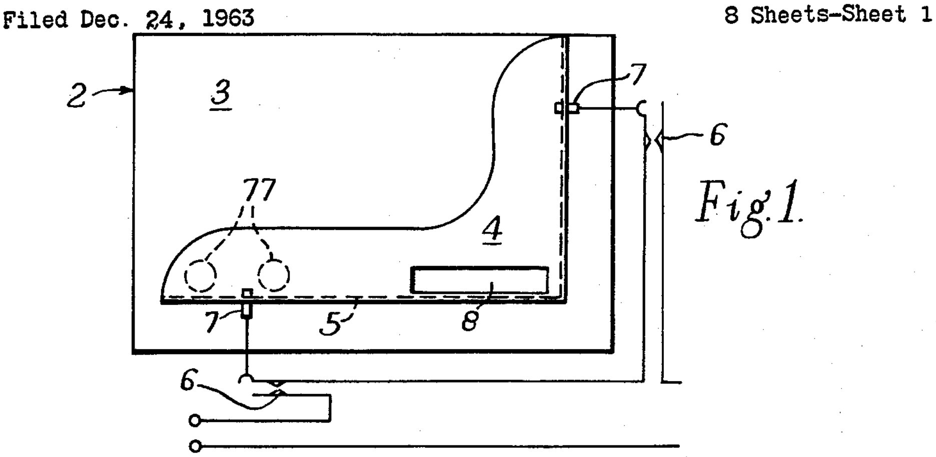
Figure 2:
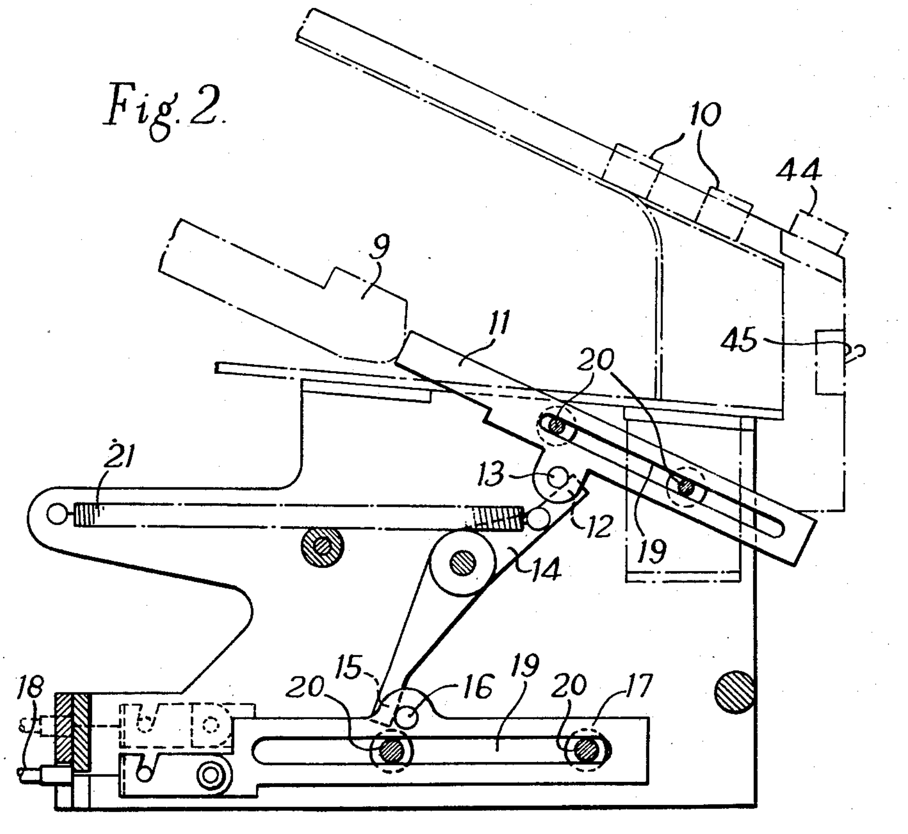
Figure 3:
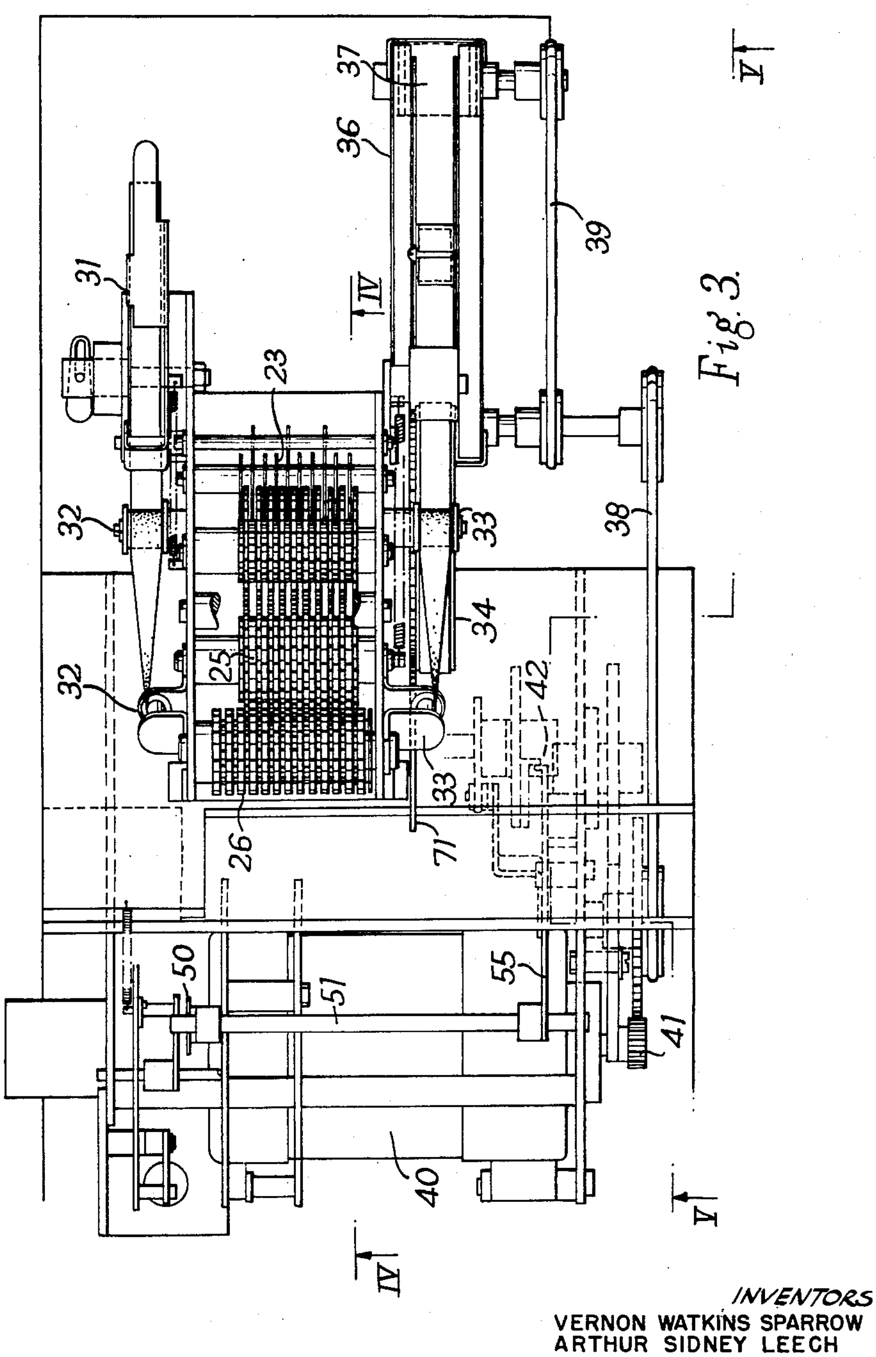
Figure 4:
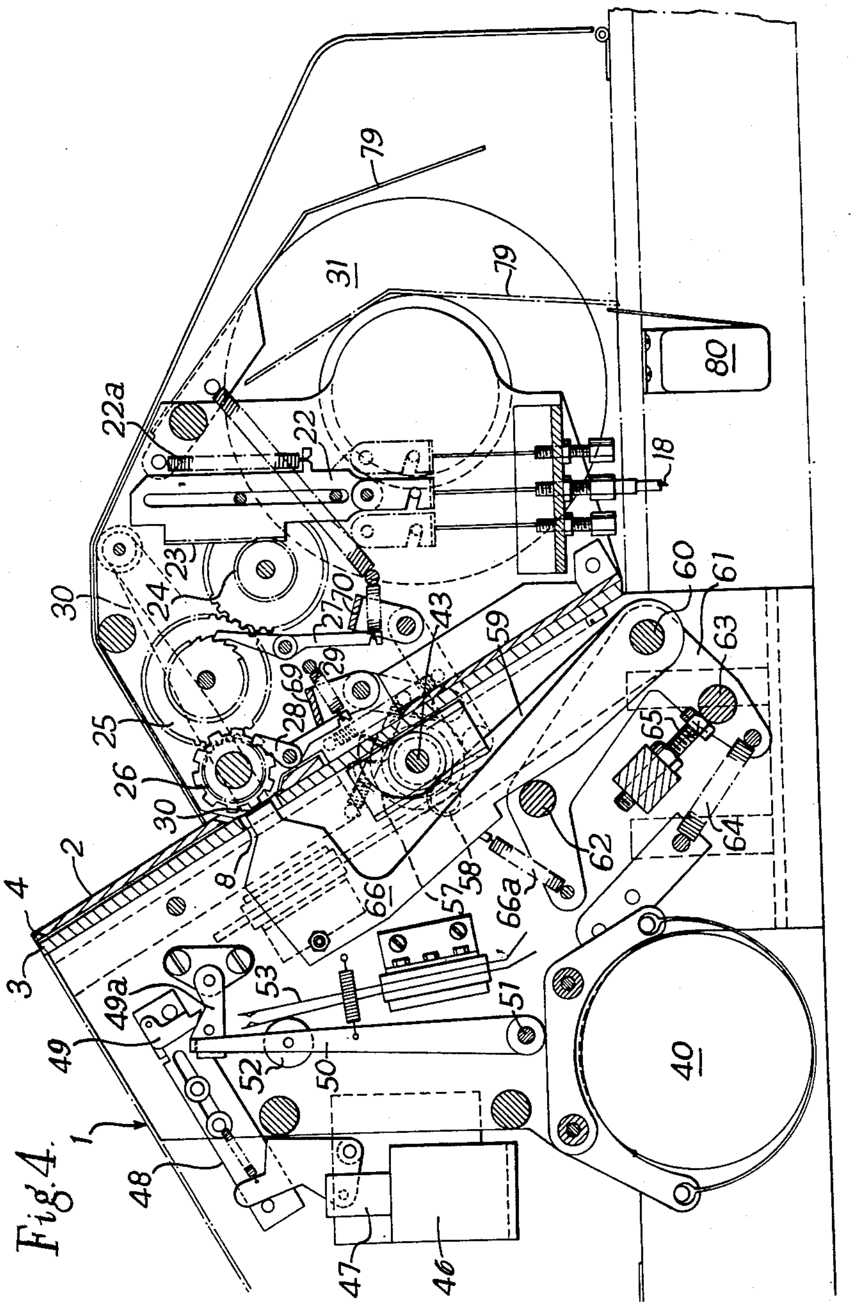
Figure 5:
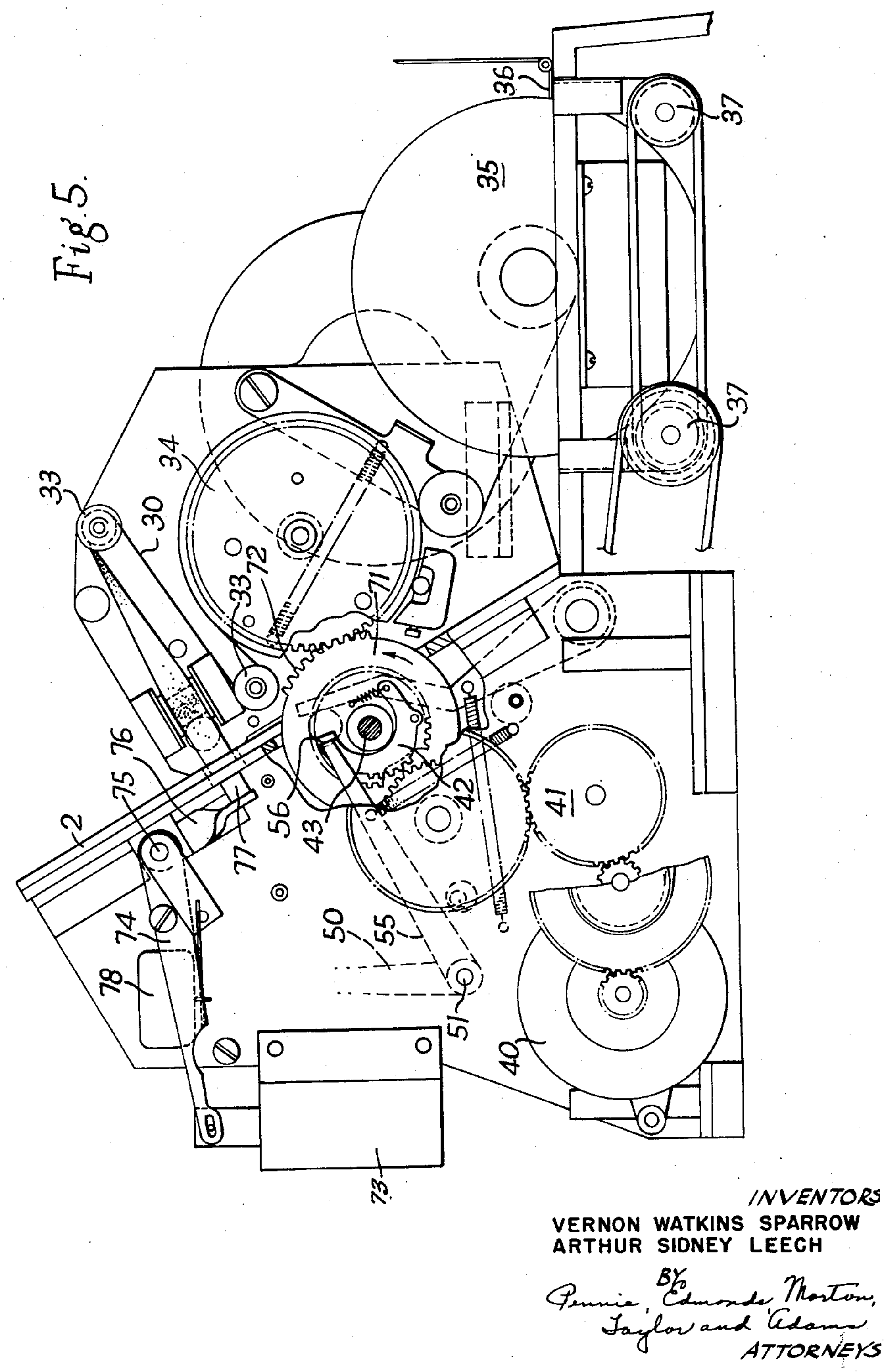
Figure 6:
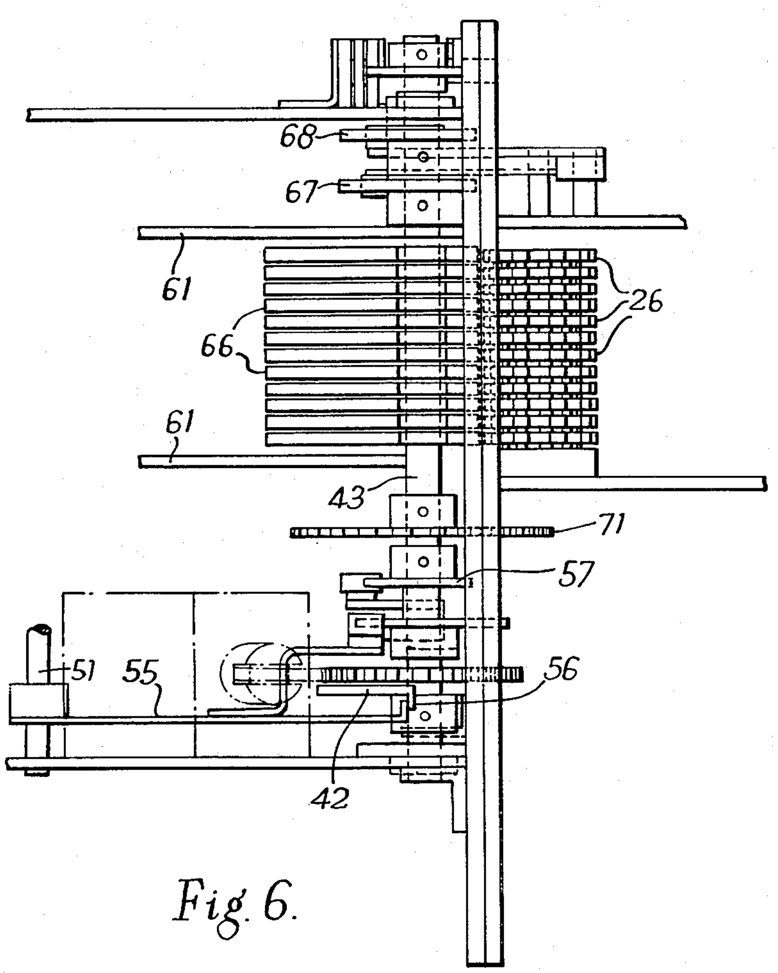
Figure 7:
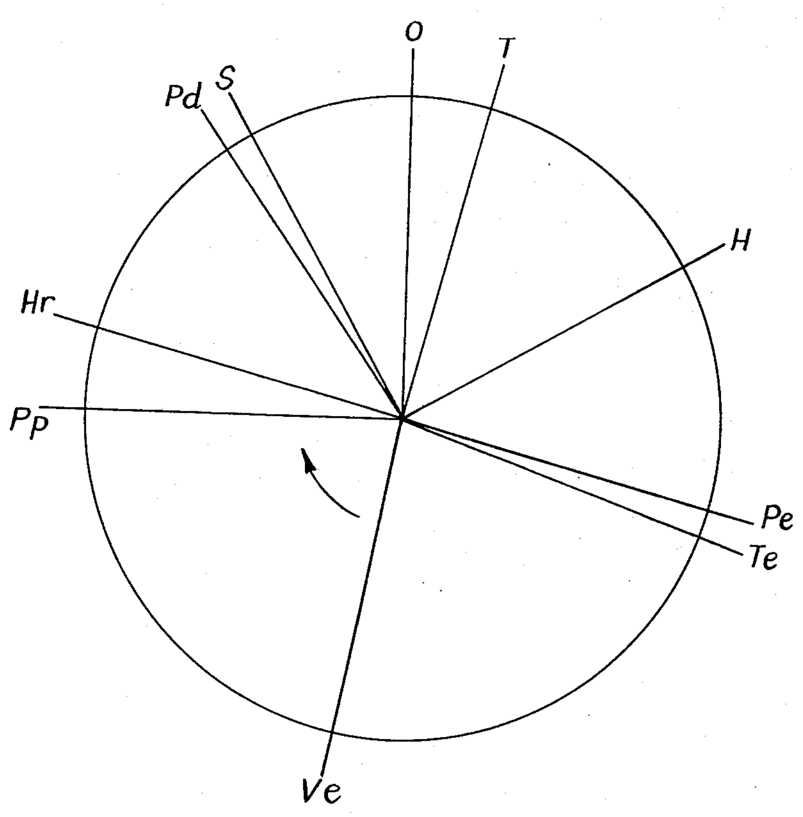
Figure 8:
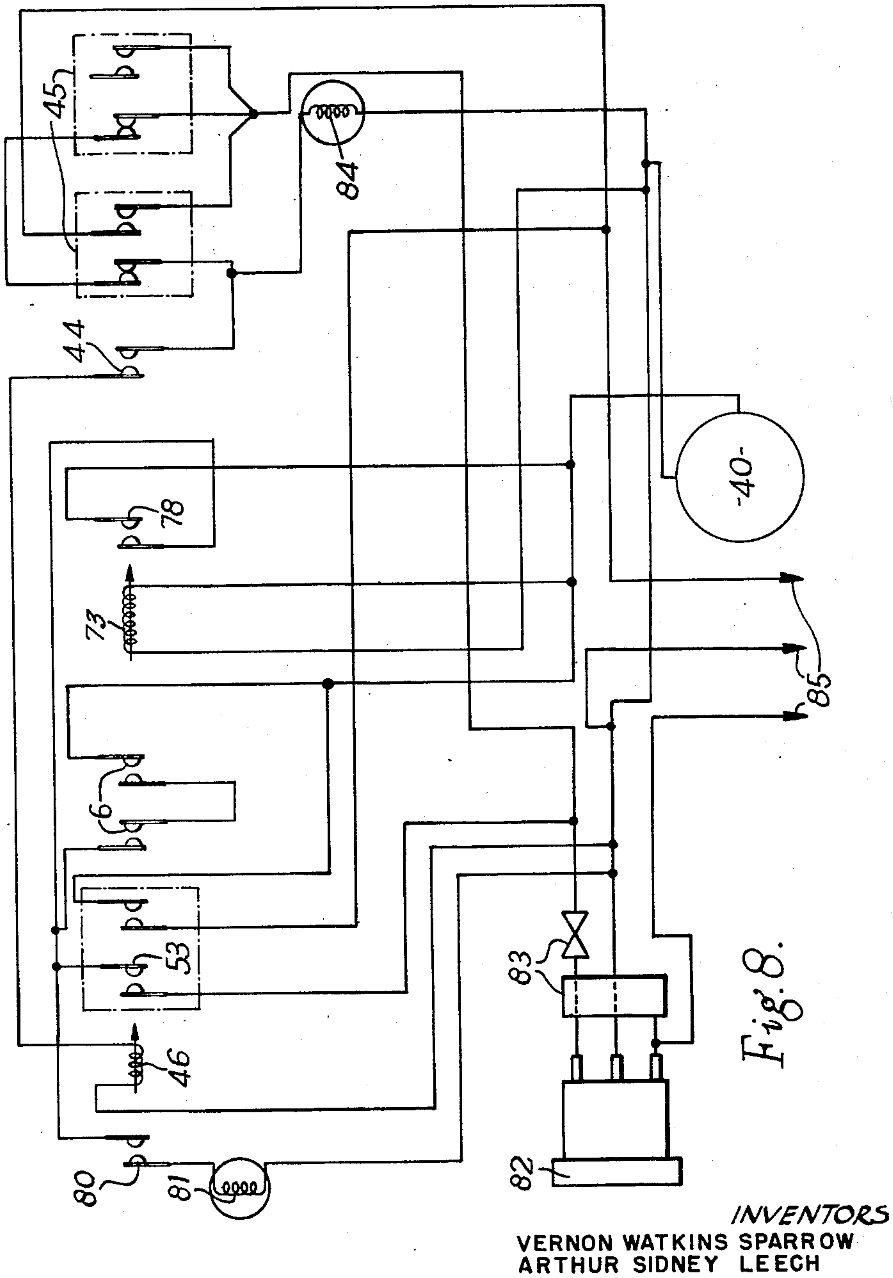
Figure 9:
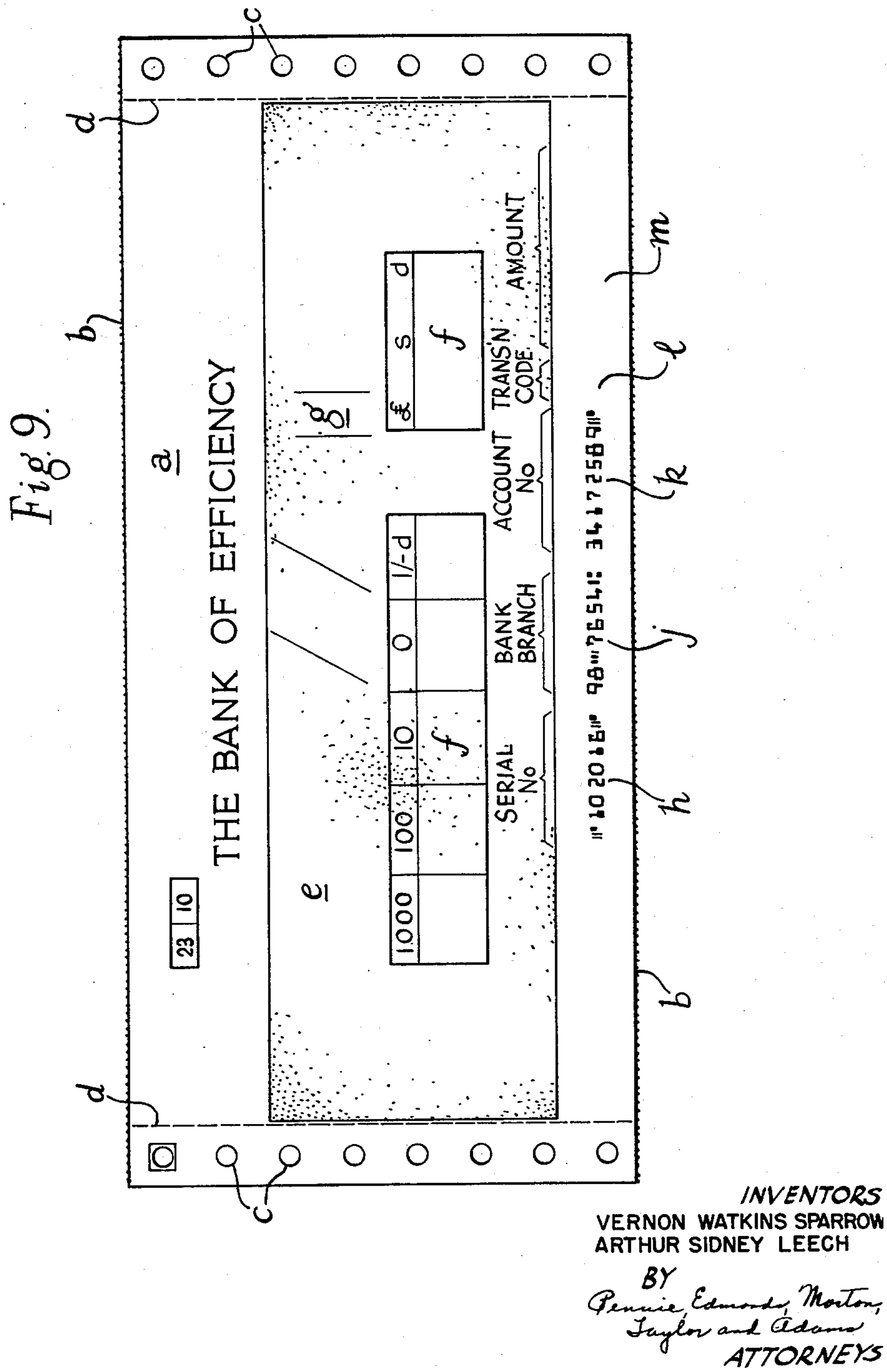

An imprinting machine in accordance with the invention will now be described by way of example with reference to the accompanying drawings which illustrate a cheque imprinting machine for use in conjunction with a calculating machine and in which FIG. 1 is a view of the cheque locating mechanism, FIG. 2 is a view of the sensing apparatus associated with the calculating machine, FIG. 3 is a plan view of the document imprinting machine, FIGS. 4 and 5 are sectional views taken on the lines IV—IV and V—V of FIG. 3, FIG. 6 is a view of the drive shaft of the machine, FIG. 7 is a view showing the sequence of operation of the apparatus, FIG. 8 is an electric circuit diagram, and FIG. 9 shows a cheque for use with the imprinting machine.

The document imprinting apparatus 1 includes a document holder 2 (FIG. 1) which includes a rear plate 3 and a closely spaced front plate 4 parallel to the rear plate. A cheque to be imprinted, is inserted between these plates 3 and 4. The outer ends of the plates diverge and are shaped to assist the feeding of the leading edge of the cheque between the plates. The lower end of the front plate 4 abuts the rear plate 3 and serves to form a support for the lower edge of the cheque as it is fed into the holder towards the imprinting position. The inner end of the front plate 4 also abuts the rear plate 3 and serves as a stop for the cheque as it is slid into position and also serves to locate the cheque correctly in position for imprinting. A pair of sensing fingers 7 each of which cooperates with a respective micro switch 6, is located adjacent the lower guide and adjacent the back stop guide respectively. These two micro switches 6 are arranged to be closed when a cheque is correctly located in position. However, these fingers 7 are so loaded that they will not be sensed by the weight of the cheque alone. It is required that a slight pressure be applied to the cheque to insert it into position. The plates 3 and 4 each have a window 8 to permit printing on the cheque.

One example of a cheque to be used with the imprinting apparatus is illustrated at FIG. 9. The cheque *a* is one of a continuous web divided into cheques by accurately spaced cross perforations *b*. Marginal feed perforations *c* are formed in the side margins of the web and accurately spaced tear off perforations *d* are formed adjacent the marginal edge to enable the marginal portions to be detached. Parts *e*, *f* and *g* of the cheque are arranged to receive recorded information including the name of the person to whom the cheque is to be paid, the amount in words and figures for which the cheque is made payable and the date. There are also included areas *h*, *j* and *k* to include further details in characters printed in magnetic ink. These include the serial number of the cheque, the bank branch number and the customer's account number. Areas *l* and *m* are included for recording further information including a transaction code and an amount to be imprinted by the imprinting apparatus in line with the character areas *h*, *j* and *k*.

Th document imprinting apparatus illustrated is designed for use with a calculating machine as sold under the registered trademark "Victor." This "Victor" machine includes a plurality of racks illustrated diagrammatically at 9 (FIG. 2) and each of which is driven by a motor to be set up in the machine in accordance with a predetermined calculation determined by which one or more of a set of keys is depressed. Thus, for example, a series of monetary amounts may be entered into the machine on the orders of the keys 10 and be added up by mechanism in the machine and the answer be indicated by the setting of this plurality of racks, each separate rack representing a different denomination. A slide member 11 is located at the trailing end of each rack. This slide member 11 has a boss 12 on its underside with a pin 13 therein and this pin 13 cooperates with a pivoted lever 14 mounted underneath the slide member 11. The other end of the lever abuts a similar boss 15 and pin 16 mounted on a further slide member 17 which is connected to an end of a flexible concentric cabled tube mechanism 18. Each slide member 11 and 17 has a longitudinal slot 19 with a pair of bearing guides 20 in each slot. A spring 21 is connected between the casing of the calculating apparatus and the pivoted lever 14 to urge one end of the lever into contact with the pin 13 on the underside of the slide member 11 abutting the rack 9 in the calculating machine and to urge the other end of the lever into contact with the pin 16 on the slide 17 joined to the flexible cable mechanism.

The "Victor" calculating machine has, for example, eleven racks 9, and in the document imprinting apparatus of the invention there is provided a flexible cable mechanism for each such rack together with an associated follow up mechanism as above described. Each flexible cable mechanism 18 is connected to a further slide member 22 biased upwardly by a spring 22*a* and each of these slide members has a rack 23 positioned on one side thereof. The teeth of this rack 23 engage the teeth of a gear wheel 24 and a second set of teeth of this gear wheel 24 engage with a first set of teeth on a further gear wheel 25. The teeth on the gear wheel 25 engage the teeth on a print wheel 26. This print wheel has ten print faces, each bearing a numeral in characters capable of being recognised when printed in magnetic ink by magnetic ink character recognition machines. These numerals may for example, be in the E.13.B or C.M.C.7 code characters.

The gear wheel 25 has a set of ratchet teeth to be engaged by a pawl 27 to retain the gear wheel in position when once the correct face of the print wheel has been located. A pawl 28 engages between the teeth in the print wheel which engage with the gear wheel 25 under the action of the spring 29 which serves accurately to locate the print wheel 26 in position.

It will be seen that the movement of the racks 9 in the "Victor" calculating machine is transmitted through the slides 11 and 17 and the levers 14 to the flexible cable mechanisms and through the gears 24 and 25 to the print wheels 26. Thus the slides 11 constitute means to sense the data set up on the calculating machine. As each rack 9 moves upwardly the associated lever 14 follows this movement under the action of the spring 21 and this movement continues until the rack 9 of the calculating machine has completed its forward movement and the required face of the associated print wheel 26 in the document imprinting apparatus of the invention is in its approximate position. At this time the pawl 28 is released (by mechanism to be hereinafter described) accurately to locate the print wheel in position by engaging the teeth on the wheel 26. As the rack 9 returns the lever follows such rack movement. However, because the pawl 27 has engaged the teeth of the gear wheel 25 this gear wheel cannot return, neither can the flexible cable mechanism move and the slide 17 remains stationary. Hence, the end of the lever 14 moves away from the pin 16 on the lever 17, but the print wheel remains at the present position corresponding to a number determined by the position reached by the rack 9. Thus, if the rack 9 is halted in position four the print wheel will also be halted in position four and be locked in this position.

A ribbon or tape 30 bearing magnetic ink transfer material is fed from a supply spool 31 over guide rollers 32, past the print wheels 26 and over further guide rollers 33 to a drive roller 34 so that a fresh length of tape is used for imprinting after each setting up of the print wheels. The tape is fed from the drive roller 34 to a take up spool 35 (FIG. 5).

The take up spool fits into a trough like casing 36 in the base of which two rollers 37 are located. These rollers are driven through a drive including a pair of endless bands 38 and 39 from a continuously running drive motor 40.

The take up spool rests on the rollers 37 so that the spool can ride on the rollers and be prevented from rotating by the tension in the tape. When however, the tape is fed by rotation of the drive roller 34 the take up spool 35 is rotated to maintain the tape in a taut condition.

The motor 40 is connected through a gear train 41 to a one revolution clutch mechanism 42. The output of the one revolution clutch mechanism is connected to a drive shaft 43 (FIG. 5). This shaft carries a plurality of cams which effect operation of various driven mechanisms (to be hereinafter described) as well as to effect operation of the imprinting apparatus.

A starting switch 44 (FIG. 2) is mounted on the casing of the "Victor" calculating machine and which serves to initiate the imprinting operation. A selector switch 45 is also mounted on the casing of the "Victor" machine and has two positions, in the first of which the "Victor" machine is disconnected from the imprinting apparatus so that it can operate independently, and in the second of which the imprinting apparatus is connected electrically to the "Victor" machine. The starting switch 44 is connected in a starting circuit with the start solenoid 46 (FIG. 4). The armature 47 of this solenoid is connected to a slide mechanism 48 which has an abutting arm 49 which engages a pivotal arm 49*a* which has a latch which is engaged by the end of an arm 50 to release it when the arm 49*a* is pivoted. The arm 50 is secured to a shaft 51 so that on movement of the armature 47 the slide 48 is moved to pivot the arm 50 and rotate the shaft 51. A roller 52 is mounted on the arm 50 so that as this arm is pivoted the roller 52 opens and closes a pair of contacts 53 connected in a circuit to the motor 40. Thus operation of the solenoid 46 serves to start the motor 40.

The shaft 51 (FIG. 3) is also connected to an arm 55 (FIG. 5) so that when the solenoid is operated the arm 55 is pivoted so that the end of the arm moves out of the path of an abutment 56 on the one revolution clutch mechanism 42 so that the clutch mechanism may drive and the cam drive shaft 43 be rotated.

The drive shaft 43 carries a snail cam 57 (FIGS. 4 and 6) which cooperates with a follower roller 58 on a framework 59 pivoted about the shaft 60. The framework includes two side brackets 61 between which cross shafts 62 and 63 are mounted. A pair of heavy springs 64 are mounted between the framework 61 and the casing of the imprinting apparatus and a stop member 65 locates the framework 61. A plurality of print hammers 66 are located between the two brackets 61 and each hammer is spring loaded towards the shaft 62 by springs 66*a*. The hammers correspond in number to the number of print wheels 26 and each hammer cooperates with a respective print wheel on opposite sides of the position which the cheque to be printed assumes and of the magnetic material tape 30. Thus, as the shaft 43 is rotated the snail cam 57 urges the arm 59 outwardly to move the framework 61 and the hammer 66 outwardly. After the follower has moved over the top of the snail cam 57 the follower 58 and framework 61 move sharply inwards to carry the hammers. The framework comes up against the stop 65 but the hammers continue to move against the action of the respective springs 66*a* due to their own momentum. Thus, they strike against the cheque to be imprinted against the tape 30 and print wheels 26 to effect imprinting of the desired number on the cheque through the window 8 in the plates 3 and 4.

The shaft 43 carries additional cams 67 and 68 which serve to move the pawls 27 and 28 out of the respective teeth on the print wheels 26 and gear wheels 25. Each cam cooperates with a respective cross bail 69 and 70 to cooperate with the respective plurality of pawls, one pawl for each gear and print wheel.

The shaft 43 carries a wheel 71 bearing a plurality of teeth 72 spaced around part of its circumference and these teeth drive the teeth spaced around the tape drive roller 34. The number of teeth on the wheel 71 determines the distance the tape is fed. This is slightly in excess of the spacing of the total number of characters to be imprinted on the cheque. The teeth 72 must be so located on the wheel 71 so that the tape is not being fed at the same time as printing is taking place.

The starting switch 44 is connected in the circuit of the clamp solenoid 73 (FIG. 5). The armature of this solenoid is connected to a pivoted arm 74 mounted in a shaft 75 and solid with a shorter arm 76. The outer end of the arm 76 carries clamping pads 77 which when the solenoid 73 is operated clamp the cheque in position and prevents its being removed or moved. The arm 74 has an abutment which engages a complementary abutment on a continuation micro switch 78 which acts as a hold on switch to ensure that the operation is completed and that the drive members are not stopped in their half way position.

The supply spool 31 for the tape 30 has associated with it a feeler 79 which is spring urged towards the tape on the spool 31. When the tape is nearly exhausted the feeler 79 contacts an arm on a micro switch 80 to operate the switch and light a lamp 81 to indicate that the spool is nearly exhausted.

Referring to FIG. 8 of the drawings, an electric supply 82 is connected to a suppressor fuse circuit 83. The start switches 44 and selector switches 45 on the "Victor" calculating machine are connected in series with the start solenoid 46. The switch 53 operated by the start solenoid is in series with the paper switches 6 and the motor 40. The motor 40 is in parallel with the clamp solenoid 73. The spool exhaust switch 80 is in series with the associated lamp 81 and a neon indicator lamp 84 is in circuit with the selector switch 45 to indicate whether the imprinting apparatus is operating. The leads 85 are connected to the calculating machine including the motor circuit.

FIG. 7 illustrates the sequence of operation of the machine which starts at 0 by depression of the starting switch 44. The line T represents the start of the feeding of the tape 30 and H represents the starting of the lifting of the print hammers. P*e* represents the engagement of the pawl with the gear wheel 25 while T*e* represents the end of the tape feeding and V*e* the end of the calculating machine operation. P*p* represents the engagement of the pawl with the print wheel 26 and H*r* represents the release of the print hammers for effecting printing. P*d* represents the disengagement of the print wheel pawl and S the time of switching off the circuit by resetting the one revolution clutch.

It is required that a complete cycle of the calculating machine shall be a fraction of the complete cycle of the imprinting means to ensure that the cycles of operation of the two machines coordinate as desired.

The operation of the machine will now be described. An amount is set up on the "Victor" calculating machine. The cheque is fed to and located in the document holder and when correctly located the micro switches 6 are operated. The operation of such micro switches conditions the starting circuit. On depression of the starting switch 44 the starting solenoid 45 is operated, the motor 40 is started and the clamping solenoid 73 is energised to clamp the cheque in imprinting position.

The energization of the calculating machine driving motor serves to move each rack 9 in the calculating machine a distance in accordance with the setting of the amount entered in that machine. The movement of these racks is transmitted through the slides 11 and 17, flexible cable mechanism 18, slide 22 and gear trains to the print wheels 26.

Depression of the button 44 will also have energised the motor 40 and the one revolution clutch will be operative. The operation of the one revolution clutch will rotate the shaft 43 and the cams will operate to perform their various functions.

When the print wheels have been set up the pawl 27 engages the ratchet teeth on the gear wheel 25 approximately to locate the print wheel. Pawl 28 then engages the teeth on the wheel 26 accurately to locate the print wheel 26 in position.

As soon as the print wheel 26 has been accurately located and locked in position the hammers 66 are operated thereby effecting the imprinting. At this time the ratchets associated with the print wheels 26 and the gears 25 are disengaged to permit the print wheels to return by the action of the springs **22*a***.

At the end of the printing operation, the driving motor 40 is de-energised and the one revolution clutch mechanism will be inoperative. The start button will also return to its initial position.

The used section of transfer tape is fed forward by the predetermined amount during the first part of the subsequent imprinting operation.

Although the invention has been described by way of example to a cheque imprinting apparatus it may also be applied to a machine for imprinting data on insurance renewal receipts and other documents.

What we claim is:

1. Document imprinting apparatus for use with a calculating machine having a plurality of racks each settable in accordance with data to be read out of the calculating machine, said apparatus comprising a document holder to receive a document inserted manually therein, a plurality of print members each capable of printing variable data on a document supported in the document holder, a plurality of first slide members, each of said slide members abutting one end of respective racks to follow the movement thereof, a plurality of second slide members to transmit each the movement of a separate one of said first slide members to a separate one of said print members, and a plurality of connecting levers, the opposite ends of each of said levers being engageable with a separate one of said first and second slide members.

2. Document imprinting apparatus for use with a calculating machine having a plurality of racks each settable in accordance with data to be read out of the calculating machine, said apparatus comprising a document holder to receive a document inserted manually therein, a plurality of print members each capable of printing variable data on a document supported in the document holder, a plurality of first slide members, each of said slide members abutting one end of respective racks to follow the movement thereof, a plurality of second slide members to transmit each the movement of a separate one of said first slide members to a separate one of said print members, a plurality of connecting levers, the opposite ends of each of said levers being engageable with a separate one of said first and second slide members, and means to lock said print members as advanced by said second slide members.

3. Document imprinting apparatus for use with a calculating machine having for each of plural numerical orders a rack differentially displaceable from a zero position in accordance with a digital value entered in such order of the calculating machine, said racks being disposed side-by-side, said apparatus comprising a document holder to receive a document manually inserted therein, a plurality of movable print members each capable of printing variable data on a document supported in the document holder, a plurality of slide members, means supporting said slide members side-by-side in relative position to be engageable each with a separate one of the racks of such a calculating machine, separate resilient means urging each of said slides against its associated one of said racks, separate means coupling each of said slides with a separate one of said print members, and cyclically operable means to lock said print members and to press a document supported in the document holder against said print members.

4. Document imprinting apparatus for use with a calculating machine having for each of plural numerical orders a rack differentially displaceable from a zero position in accordance with a digital value entered in such order of the calculating machine, sad racks being disposed side-by-side, said apparatus comprising a document holder to receive a document manually inserted therein, a plurality of movable print members each capable of printing variable data on a document supported in the document holder, a plurality of elongate slide members, means movably supporting said slide members side-by-side in position to be aligned and engageable each with a separate one of the racks of such a calculating machine, separate resilient means urging each of said slides against its associated one of said racks, separate flexible means coupling each of said slides with a separate one of said print members, and cyclically operable means to lock said print members and to press a document supported in the document holder against said print members.

References Cited by the Examiner

UNITED STATES PATENTS

| | | | |
|---|---|---|---|
| 1,997,137 | 4/1935 | Florance | 101—407 |
| 2,045,996 | 6/1936 | Rast | 101—287 |
| 2,238,507 | 4/1941 | Ruttiman | 101—287 |
| 2,427,418 | 9/1947 | Rast | 101—90 |
| 2,482,726 | 7/1949 | Clements | 101—407 |
| 2,787,952 | 4/1957 | Roche | 101—93 |
| 3,088,400 | 5/1963 | Bergland et al. | 101—93 |

ROBERT E. PULFREY, *Primary Examiner.*

WILLIAM B. PENN, *Examiner.*

P. R. WOODS, *Assistant Examiner.*